April 23, 1935.  A. M. BACH  1,998,434
MATERIAL HANDLING APPARATUS
Original Filed Jan. 9, 1932  8 Sheets-Sheet 6

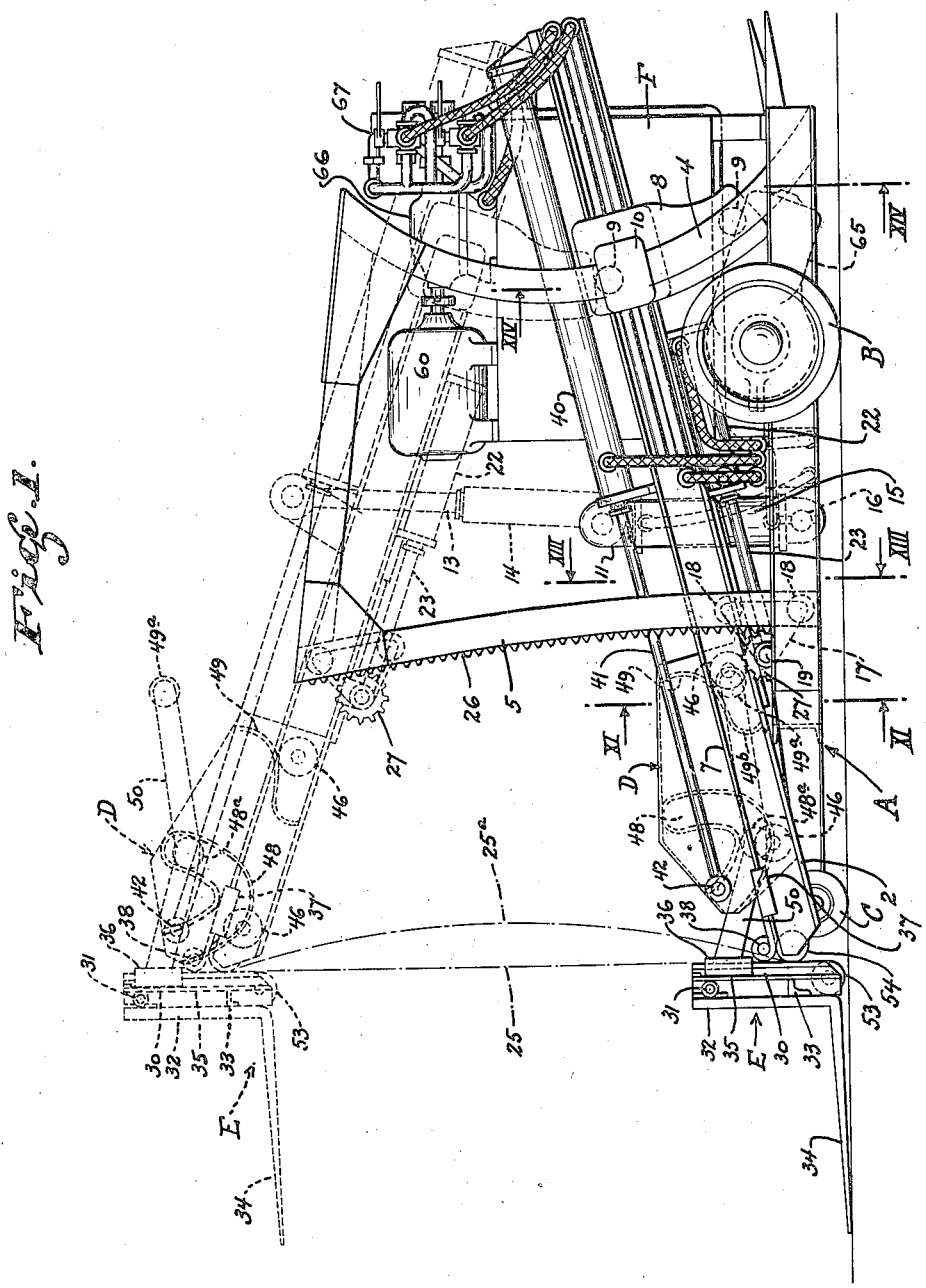

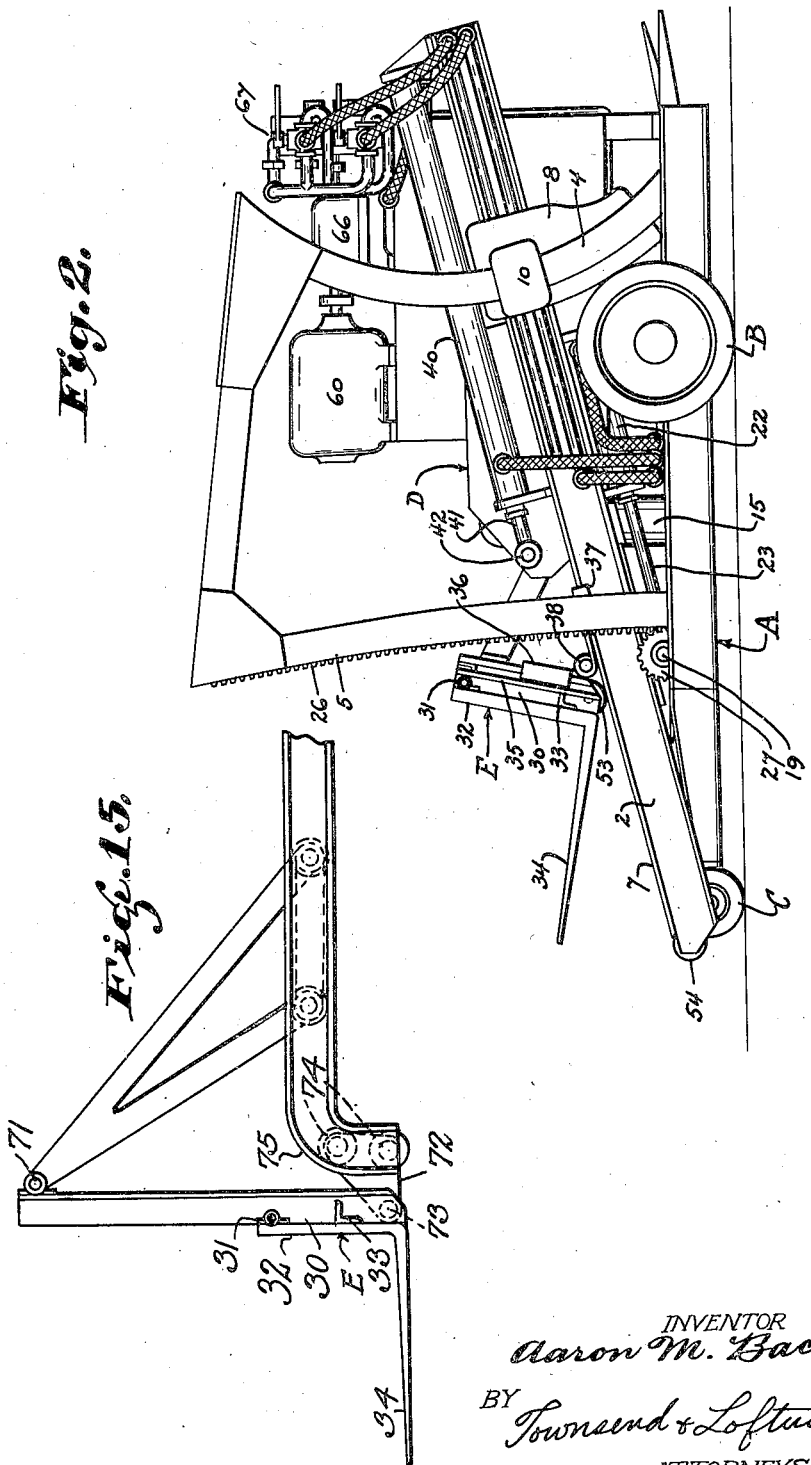

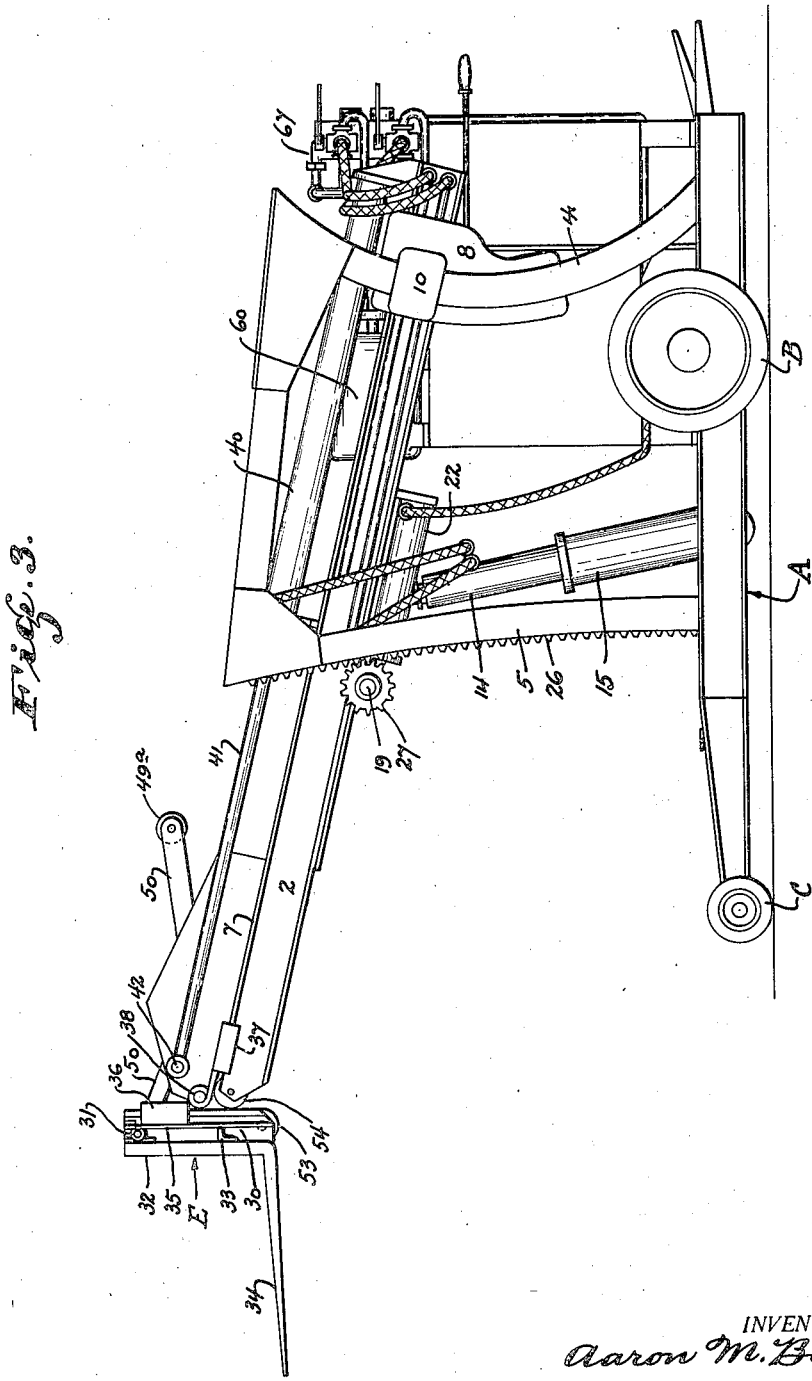

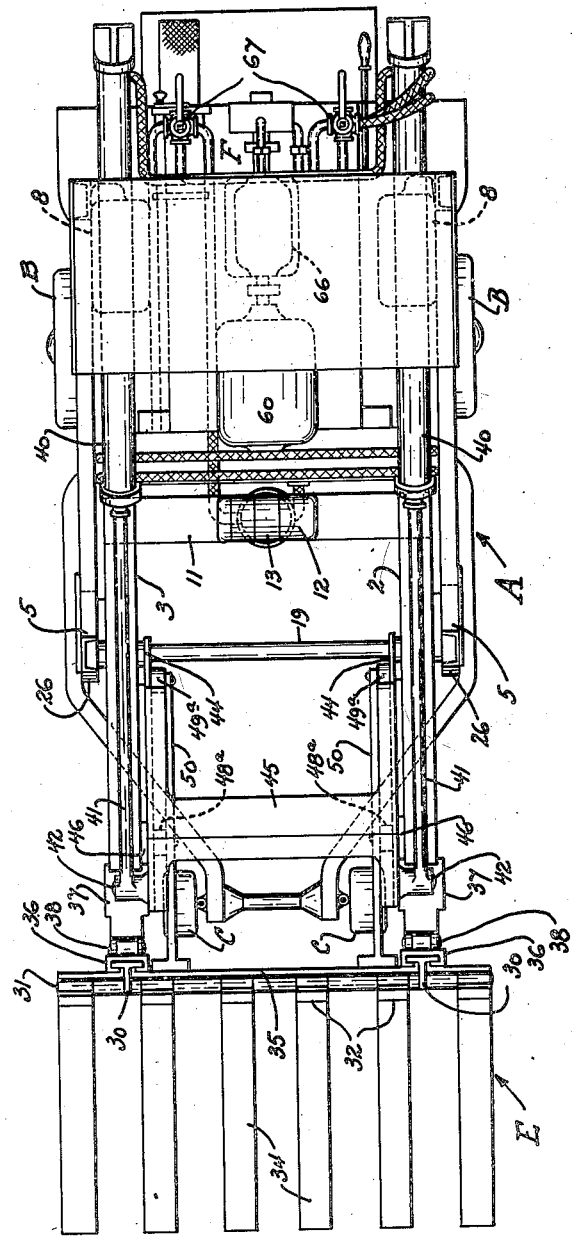

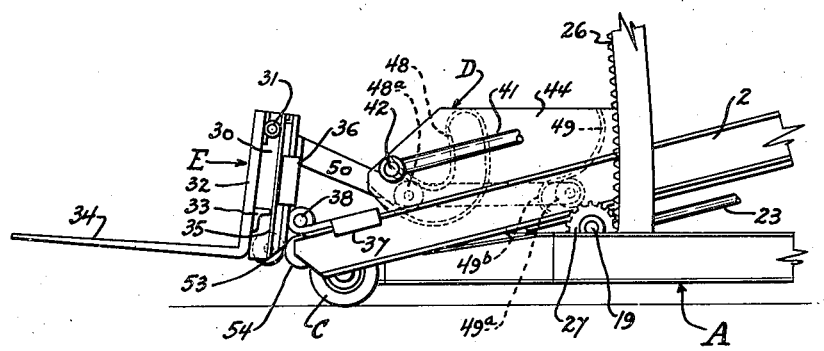
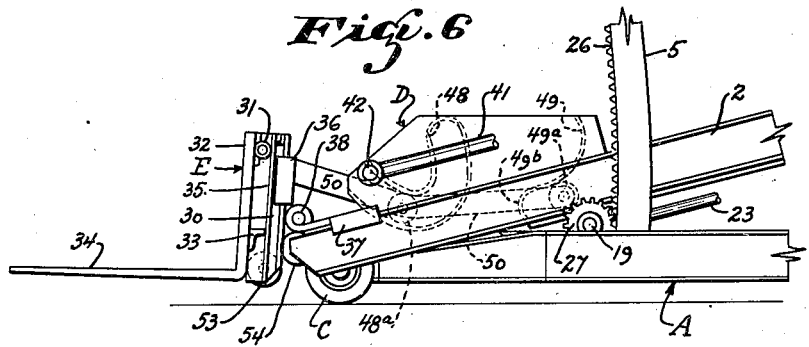
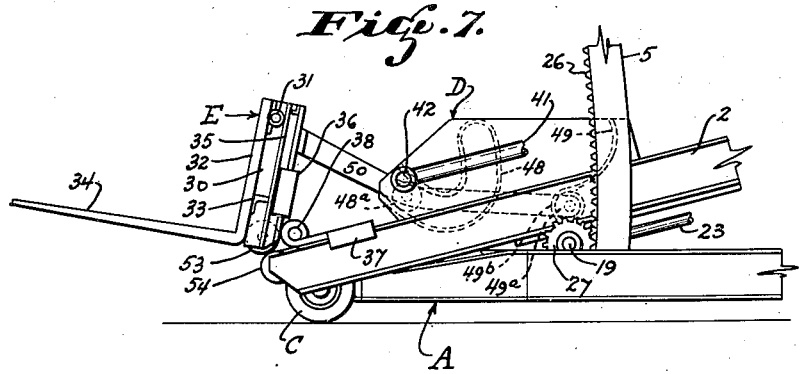

INVENTOR.
Aaron M. Bach.
BY Townsend & Loftus.
ATTORNEYS.

April 23, 1935.   A. M. BACH   1,998,434
MATERIAL HANDLING APPARATUS
Original Filed Jan. 9, 1932   8 Sheets-Sheet 7
Fig. 10.
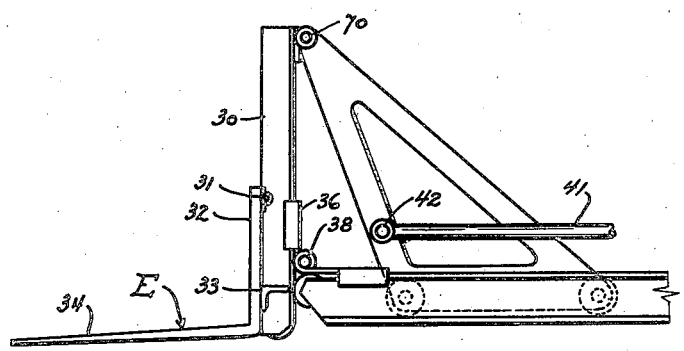
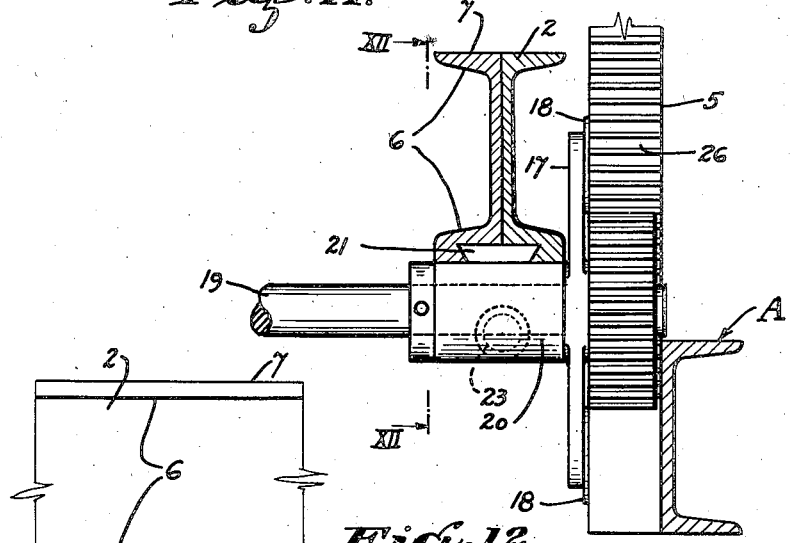
INVENTOR.
Aaron M. Bach.
BY Townsend & Loftus
ATTORNEYS.

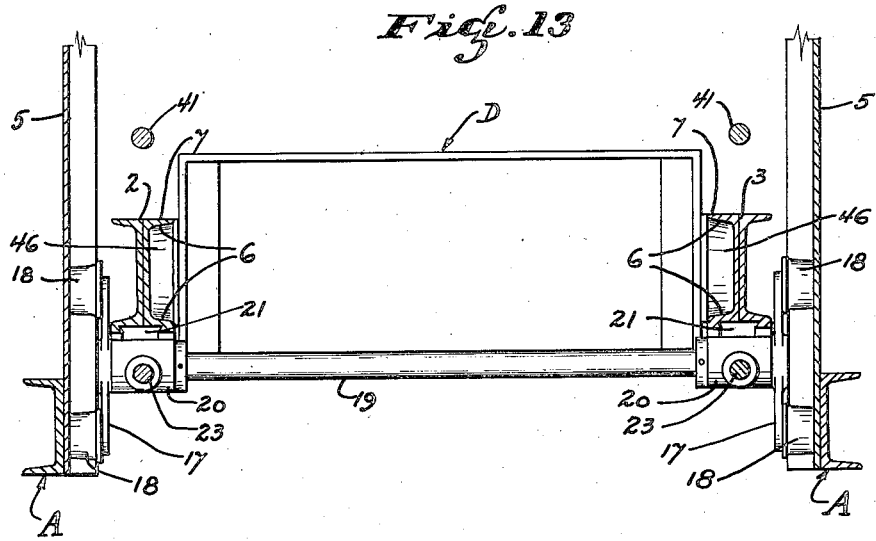
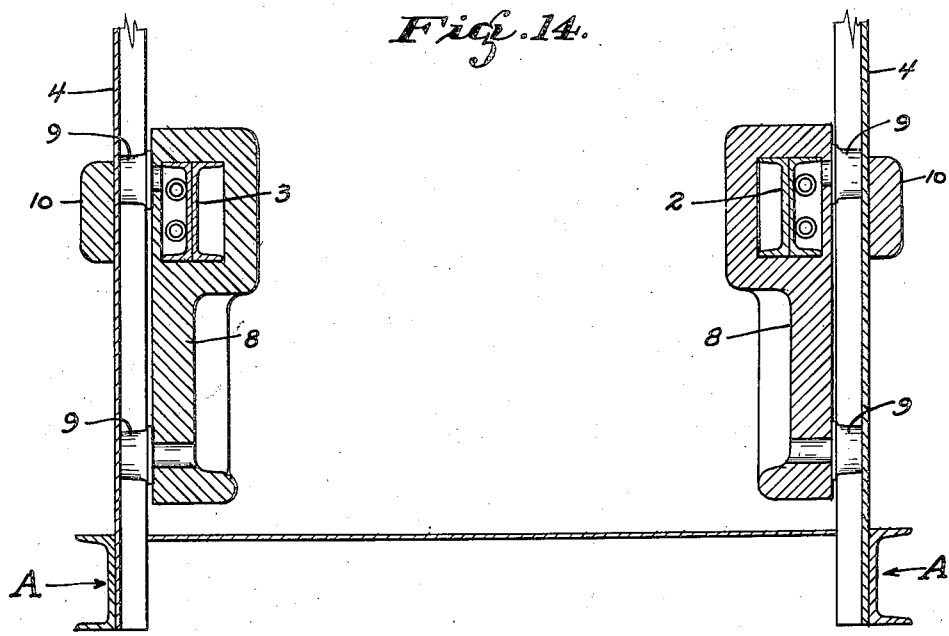

Patented Apr. 23, 1935

1,998,434

UNITED STATES PATENT OFFICE 1,998,434

MATERIAL HANDLING APPARATUS

Aaron M. Bach, San Francisco, Calif.

Application January 9, 1932, Serial No. 585,685
Renewed January 30, 1934

12 Claims. (Cl. 214—140)

This invention relates to material handling apparatus, such as power driven trucks and the like, which are employed for the purpose of loading, unloading and transporting freight and other materials, and especially to improvements in the construction and operation of trucks of this character which will increase their general utility and working range.

The object of the present invention is to generally improve and simplify the construction and operation of trucks of the character described; to provide a truck whereby material may be readily picked up, transported and unloaded; to provide a truck whereby materials such as boxes, sacks, etc., may be readily removed from a stack or pile, then transported, and again stacked and piled; to provide a truck having a lifting or load elevating range which substantially exceeds its vertical dimensions so as to adapt it for use in quarters presenting low headroom as in low ceilinged warehouses, between decks on ships, etc.; to provide a truck which is capable of picking up a load from a floor or a point below the same as a pit, etc.; to provide a truck which is capable of tilting and retracting the load after it is picked up to a point rearwardly of the front wheels thereby materially shortening the over-all length, improving traction and balance and enabling short turning radius while the load is being transported; and further, to provide a truck in which the load carrying member is interchangeable with other tools or devices, such as shovels, scrapers, forks, hooks, etc., thereby increasing the utility and range of operation of the truck.

The material handling truck is shown by way of illustration in the accompanying drawings, in which—

Fig. 1 is a side elevation of the same.

Fig. 2 is another side elevation showing the load handling member in retracted position.

Fig. 3 is another side elevation showing the boom and load handling member in elevated position.

Fig. 4 is a plan view of Fig. 1.

Figs. 5, 6, 7 and 8 are fragmentary side elevations of the forward end of the boom showing the cam carriage and the load handling member, said views showing different positions which the load handling member and cam carriage may assume.

Fig. 10 is a similar fragmentary view of the front end of the boom, showing a modified form of carriage and load handling member.

Fig. 11 is an enlarged cross section taken on line XI—XI of Fig. 1.

Fig. 12 is a cross section taken on line XII—XII of Fig. 11.

Fig. 13 is an enlarged cross section taken on line XIII—XIII of Fig. 1.

Fig. 14 is an enlarged cross section taken on line XIV—XIV of Fig. 1.

Fig. 15 is a fragmentary side elevation of the forward end of the boom, showing a modified form of the boom, the carriage and the load handling member.

Figure 8:
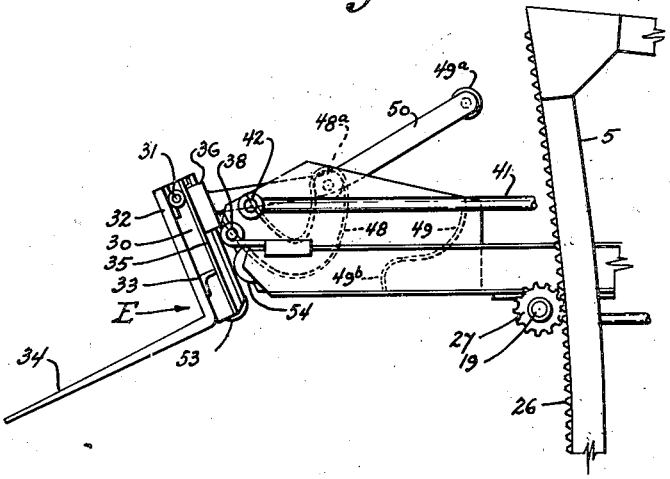
Figure 9:
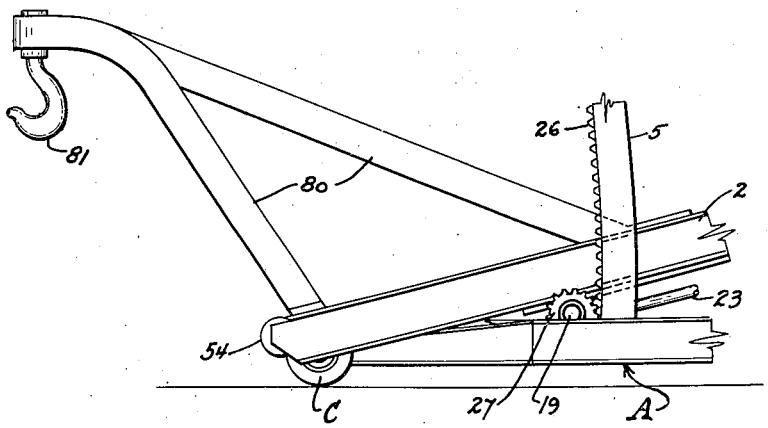
Fig. 9 is a fragmentary view showing the front end of the boom and a crane or hook attached thereto.

Referring to the drawings in detail and particularly Figs. 1 and 4, A indicates the body or main frame of a truck, B the rear driving wheels, and C the front steering wheels. Supported by the truck is a boom consisting of a pair of interspaced parallel arms 2 and 3 and forming a support and guide for said arms are vertically disposed arcuate guide tracks 4 and 5; there being two tracks 4, one on each side of the truck at the rear end thereof, and two tracks 5 near the forward end and on opposite sides. The main function of the tracks 4 is that of supporting the rear ends of the boom arms and of guiding the same so as to swing in a predetermined arc, and the function of the tracks 5 is that of automatically imparting longitudinal movement to the boom arms when they are raised or lowered so that the outer or free ends will travel in a predetermined path, as will hereinafter be described.

Each boom arm, as shown in Figs. 11, 13 and 14, consists of two channel beams placed back to back and welded or otherwise secured with relation to each other. This provides the strength and rigidity required and at the same time provides inner track surfaces 6 for a carriage D and upper track surfaces 7 for a load handling member E, which will later be described.

Each rear guide track 4 is provided with a carriage, each carriage consisting of a body member 8 on which is journaled guide rollers 9. These rollers extend into the guide tracks, which are channel-shaped to receive them, and they are maintained in engagement with said guide tracks by guide shoes 10 forming a part of each carriage and totally surrounding or embracing the respective guide tracks. The rear ends of the boom arms extend through the carriages or in other words the body members 8 and as such are supported thereby, and they are also slidably mounted in the carriages for longitudinal movement, as will hereinafter be described.

A cross brace 11 connects the arms of the boom at a point intermediate the tracks 4 and 5. This cross brace carries a yoke-shaped bearing hanger 12 and this is connected through means of a piston rod 13 with a piston or plunger 14 reciprocably mounted in a hydraulic or fluid actuated cylinder 15. The lower end of this cylinder is pivotally supported as at 16 in the main frame or body member of the truck and it is provided with flexible hose connections, as shown, through which a fluid under pressure, such as oil or the like, may be admitted at one end or the other of the cylinder so as to raise or lower the piston and connecting rod as required. During such movement the boom is raised or lowered and during such raising or lowering movement the boom swings in an arcuate path which is determined by the curvature of the guide tracks 4.

Where load handling trucks of this character are employed, it is often desirable to lift the load vertically and in a straight line. If the boom illustrated in this instance was rigidly secured to the rear carriages 8, the forward end of the boom would swing in an arc, and as this is not desirable under certain operating conditions, it is essential that longitudinal movement be automatically imparted to the boom during its raising and lowering movement. The guide tracks 5 perform this function and it is accomplished as follows: Each guide track 5 is provided with a carriage 17 having rollers 18 which project into the guide tracks 5 so as to be guided thereby. The carriages are pivotally secured on a cross shaft 19 journaled in bearing members 20, see Figs. 11 and 13, which are slidably mounted with relation to the lower surface of the boom arms. A tongue and groove connection is provided between the upper surfaces of the bearings 20 and the lower surface of the boom arms as indicated at 21 and this provides the sliding connection required. A fluid or hydraulic actuated cylinder 22 is secured to the lower surface of each boom arm. Each cylinder is provided with a piston and rod, as indicated at 23, and the forward ends of these rods are secured to the bearing members 20. Normally the cylinders 22, the piston rods 23, and cross shaft 19 upon which the bearings 20 are mounted, form a rigid connection between the carriages 17 and the boom arms, hence when the boom arms are raised or lowered by the fluid actuated cylinder 15 the carriages will travel upwardly or downwardly in the arcuate guide tracks 4 and the boom arms will accordingly move in a longitudinal direction and forwardly with relation to the rear carriages when the boom arms are raised and they will, conversely, move rearwardly when the carriages 8 are lowered, the curvature of the arcuate guide tracks 5 being such that the forward ends of the boom arms will travel on a vertical line perpendicular to a horizontal plane, the line of travel being indicated by the dot and dash line shown at 25 in Fig. 1. Means have accordingly been provided for automatically imparting longitudinal movement to the boom arms when they are raised and lowered so that the forward ends of the boom arms will travel in a vertical line, or any other predetermined path, both during raising and lowering movement of the boom arms. The path taken by the free ends of the boom arms during raising and lowering movement is, as previously described, a vertical line or path perpendicular to a horizontal plane. The invention is not limited to that specific path. For instance, by increasing the curvature of the guide tracks 5, the free ends of the boom arms during raising and lowering movement may describe a curved path such as that shown by the dot and dash line indicated at 25a, and any other predetermined path may be obtained by properly shaping the guide tracks 5.

The boom arms will in actual practice be fairly widely separated, as shown in Figs. 4, 13 and 14, and as their main function is that of lifting loads, it is obvious that the load can not always be placed at a point exactly central between the boom arms, hence one arm or the other will under most conditions support a greater weight than the other. Such unbalanced conditions will naturally tend to twist the boom arms laterally with relation to each other and, if that should take place, a binding movement would occur between the rollers of the respective carriages and the guide tracks in which they travel. Such twisting movement would also tend to bind the boom arms so as to resist or secure them against longitudinal movement in respect to the carriages supporting the same.

Such binding or twisting has been entirely eliminated in the present structure and this is accomplished by placing a rack bar 26 on each guide track 5. The shaft 19 carries a pinion 27 at each end and, as the pinions are positioned so as to constantly mesh with the respective rack bars 26, twisting of one boom arm with relation to the other can not occur as the boom arms rest on top of the bearings 20 through which shaft 19 extends. For instance, if a greater load is placed on one boom arm than on the other, that arm will obviously tend to move downwardly with relation to its adjacent guide track. Such downward movement will of course impart rotation to the pinion 27, which cooperates with that particular arm, and if the arm moves downwardly, even a small fraction of an inch, rotation of the adjacent pinion 27 will take place and as this is keyed or otherwise secured to the cross shaft 19, the shaft will rotate and the pinion on the opposite side will rotate, hence forcing the opposite boom arm downwardly a similar distance. The gear racks 26 and the pinions 27 accordingly function as compensators as they automatically and positively maintain both boom arms at the same elevation at any given point, either during upward or downward movement of the arms or when at rest, and binding and twisting is accordingly entirely eliminated.

The cylinders 22 and piston rods 23 have another function besides that of an anchor member between the boom arms and cross shaft 19. Each cylinder is provided with inlet and outlet connections at opposite ends and these are connected through flexible conduits or the like with a source of fluid supply under pressure. The fluid flow is valve controlled, as will hereinafter be described, and the fluid may accordingly be admitted to one end of the cylinders or the other under pressure so as to extend or retract the piston rods. During such movement longitudinal movement is imparted to the boom arms and the arms may be retracted or extended with relation to the truck body as desired, a retracted position of the boom arms being shown in Fig. 2 and an elevated and extended position of the same being shown in Fig. 3.

The main function of the boom or the arms forming the same is of course that of raising or lowering loads of varying kinds of material. But they also have another function as previously referred to, to-wit, that of forming guide tracks for the carriage D and a load handling member E.

The load handling member having the greatest range of utility is that shown in Figs. 1 to 4. It consists of a pair of vertically disposed I-beams 30 in the upper ends of which is secured a cross shaft 31. A plurality of arms 32 are hingedly secured at their upper ends to the shaft, the lower ends engage an angle iron cross bar 33 and at a suitable distance below the cross bar the arms are bent at right angles to provide forwardly extending forks 34 to receive and support the material to be handled.

The I-beams are tied together by the cross shaft 31 as this extends through the webs of the beams and is welded thereto. The I-beams are also tied together by the angle bar 33 and by a plate 35, said plate, together with the beam and the cross shaft, being welded to the I-beams to form a rigid back frame for the support of the arms and the load carried thereby.

The load carrying or handling member, to-wit, the back frame and the arms carried thereby is connected with the boom arms by means of shoes, such as indicated at 36 and 37, there are two pairs of shoes, one pair 36 being slidably connected to the respective I-beams 30 and the second pair being slidably connected to the respective boom arms 2 and 3. The shoes are pivotally connected, as indicated at 38, and as such permit the load handling member to assume a lowered position forwardly of the boom arms, as shown in Fig. 6. It permits the load handling member to assume partially elevated intermediate positions with relation to the forward ends of the boom arms, as shown in Figs. 5 and 7, and it permits the load handling member to assume a fully elevated position on top of the boom arms and, furthermore, to be moved longitudinally on the boom arms which function as a track, as shown in Fig. 2.

The cam carriage D actuates the load handling member, that is, it elevates the load handling member from a position below the forward end of the boom to a position on top of the same. It imparts a tilting movement to the load handling member and also longitudinal movement to the load handling member with relation to the boom. The cam carriage is longitudinally movable on the boom arms 2 and 3, and during each movement elevates, tilts and moves the load handling member longitudinally with relation to the boom arms. The cam carriage is hydraulically actuated by a pair of cylinders 40. These are suitably supported with relation to the boom arms in parallelism with the same. Both cylinders are provided with pistons and these are connected through means of piston rods 41 with opposite sides of the carriage as indicated at 42. The cylinders 40 are provided with inlet and outlet connections at opposite ends and these are connected through flexible conduits with an actuating valve, which is adapted to admit fluid under pressure to either end of the cylinders, as will hereinafter be described.

The cam carriage is best illustrated in Figs. 4, 5, 6, 7 and 8. It consists of a pair of side plates 44 connected by means of cross arms 45. A pair of rollers 46 are journaled on each side of the carriage and these project into the trackways formed on the inner sides of the respective arms 2 and 3 forming the boom. That is, the boom arms, as previously stated, are constructed of channel beams and the upper and lower inturned flanges 6 of the beams form a trackway for the rollers. The carriage is accordingly supported with relation to the arms of the boom by the rollers and can travel longitudinally with relation thereto.

The cam carriage, as the name implies, carries two sets of cams generally indicated at 48 and 49. There are two sets of these cams, one set on each side of the carriage and they are arranged on the inner faces of the plates 44 forming the sides of the carriage. A pair of arms 50 welded or otherwise secured to the back frame or plate 35 of the load handling member projects rearwardly from the back frame and are parallel with relation to the side plates of the carriage.

Each arm is provided with two rollers, the forward rollers indicated at 48a engage the cams 48 and the rear rollers indicated at 49a engage the cams 49. The normal or load receiving position of the load handling member is shown in Fig. 1. In this position the rollers 49a engage the cams 49 on the lower part of the curve of said cams as indicated, while the rollers 48a are in position where they will start to climb upwardly in the forward leg of the cams 48. Hence, if a load has been applied and it is desired to transport it to a point where the load is to be discharged or unloaded, carriage D is pulled rearwardly by means of the cylinders 40. During this rearward movement rollers 48a and 49a will act simultaneously, that is, the cam carriage will move longitudinally a slight distance independent of the arms 50 and during this independent movement the cams will change their positions with respect to the rollers 48a and 49a and assume the position shown in Fig. 6. This change of position imparts a rocking movement to the arms 50 and the load handling member is accordingly slightly tilted and at the same time slightly elevated as the rollers 48a are starting to roll upwardly in the forward end or leg of the cams 48. As the carriage continues to move rearwardly on the boom arms, rollers 48a continue to travel upwardly between the cams 48 while the rollers 49a travel along the flat or lower portion of the cams 49. The load handling member is thus gradually tilted and elevated and, as the movement of the carriage continues, it will finally assume the fully elevated position shown in Fig. 7. In this position rollers 49a engage stop members 49b at the ends of the cams 49 and if the carriage continues to travel a pull will be exerted and the load handling member and the load carried thereby may thus be retracted to assume the position shown in Fig. 2. From the foregoing it will be noted that a load has been picked up from the floor, has been elevated to the upper surface of the boom arms which function as tracks, and the load has been retracted to a point rearwardly of the front wheels thereby materially shortening the over-all length, improving traction and balance and enabling short turning radius while the load is being transported.

It will be noted that the I-beam members forming part of the back frame of the load handling members are provided with rollers 53 at their lower ends. These rollers support the load handling member when it has been elevated to a position on top of the boom arms, as shown in Figs. 2 and 7. In other words, they function as rollers to support the load on top of the boom arms, which function as tracks therefor, and as such reduce friction to a minimum. Rollers are also journaled at the forward ends of the boom arms, as indicated at 54. These engage the rear faces of the I-beams while the load handling member is being elevated and, as such, function as pivotal members about which the load handling member tilts and, furthermore, reduces friction to a minimum while the load handling members are being elevated to a point on top of the boom arm. The arms 50 in reality form a connection between the carriage D and the load handling member E whereby longitudinal movement, tilting movement and elevating movement is imparted. The elevating movement referred to being merely that of raising the load handling member from a point forwardly and below the outer ends of the boom arms to a position on top of the same, the main elevating mechanism being, of course, the boom arms themselves and the hydraulic cylinder 15 whereby they are elevated; the maximum distance a load can be elevated being shown in dotted lines in Fig. 3. The carriage, together with the load elevating member actuated thereby, may be moved longitudinally of the boom arms in any position thereof as the cylinders 40 are supported by the boom arms. For instance, when the boom arms are elevated, as shown in dotted lines in Fig. 1, or as shown in full lines in Fig. 8, the carriage and the load handling member may be moved to the outer end of the boom arms or the load handling member may be tilted to discharge the load.

The truck illustrated in the present instance is a power driven truck. A standard form of internal combustion engine may be mounted within the housing generally indicated at F. The motor drives a generator and this in turn supplies current to drive a motor generally indicated at 60 and a second motor generally indicated at 65. The internal combustion engine and the generator driven thereby are not shown as a drive of this character is used in standard practice. The motor, indicated at 65, is employed to transmit power to the rear driving wheels B so that when a load is picked up and elevated it may be transported to any point desired and there unloaded. The motor indicated at 60 drives a pump 66 and this delivers fluid under pressure to the several cylinders heretofore described. There are three sets of cylinders, a single cylinder 15 for elevating or lowering the boom, a pair of cylinders 22 for extending or retracting the boom, and a pair of cylinders 40 which function to actuate the carriage and load handling member. Four-way valves or the like, such as shown at 67, are employed and by proper manipulation the oil or fluid under pressure delivered by the pump 66 may be directed to properly operate the several cylinders.

While a load handling member and carriage of specific construction has been described and illustrated, it is obvious that various modifications thereof may be employed, see for instance Figs. 10 and 15. In Fig. 10, the side plates of the carriage are shown as triangular in shape. This obviates the necessity of using arms, such as shown at 50, as it permits the upper end of the carriage to be pivotally attached as shown at 70 to the upper end of the load handling member. Further description of this form of the modification is thought unnecessary as its operation and construction is self-evident.

In Fig. 15 another modification of the carriage and load handling member is disclosed. In this figure the carriage is of substantially the same shape and construction as that shown in Fig. 10. It is also pivotally attached to the upper end of the load handling member as indicated at 71. The shoe connection between the load handling member and the arms forming the boom are, however, entirely eliminated and a secondary carriage is employed as a substitute therefor, this carriage is shown at 72. It is pivotally attached to the lower end of the I-beams as indicated at 73 and it is provided with a pair of rollers 74. The forward ends of the beams forming the boom are curved and downwardly extended, as indicated at 75, and the rollers 74 are accordingly guided thereby and will function in cooperation with the carriage to raise and lower the load handling member with relation to the upper surface of the boom arms.

A carriage and load handling member will not always be essential where specialized work is being performed and, as such, may be entirely eliminated. For instance, where the truck is used for load lifting purposes only, crane arms 80 may be attached to the outer end of the boom and these may carry a hook 81 whereby a load may be lifted.

Summarizing the foregoing description, it should be noted that a load handling truck designed and operated as here shown has many advantages. First, a truck has been provided whereby material may be readily picked up, transported and unloaded; secondly, materials of varying shape and character may be efficiently handled thereby increasing its general utility and work range; third, a truck has been provided whereby a load may be removed either from the top of a stack or at practically any elevation desired and then transporated to a point where the material may be quickly and readily unloaded and stacked or dumped, if desired; fourth, the truck has a lifting or load elevating range which substantially exceeds its vertical dimensions—by vertical dimensions is meant the over-all height of the guide tracks indicated at 4 and 5. Fig. 1 clearly illustrates that a load may be elevated to a point above the upper ends of the guide tracks, the elevating range exceeds the vertical dimensions of the truck; fifth, due to the low clearance provided, the truck can pass through comparatively small or low entrances which is a decided advantage and as such is particularly suited for work in quarters presenting low headroom; sixth, a truck is provided which is capable of picking up a load from a floor or at a point below the same, for instance, a pit, etc., Fig. 1 illustrates the position of the load carrying member when picking a load from the floor but, inasmuch as the boom arms may be extended by means of the cylinders 22, it is obvious that a load carrying member can be projected and as such may be extended into a pit or a point of lower elevation; seventh, a truck is provided which is capable of retracting a load after it is picked up to a point rearwardly of the front wheels. This is also important as it materially shortens the over-all length when the load is carried and it improves balance and enables a short turning radius while the load is being transported; eighth, a truck is provided in which the load carrying member is interchangeable with other tools or devices, such as shovels, scrapers, forks, hooks, buckets, etc., this being of obvious advantage as it further increases the utility and range of operation.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. In an apparatus of the character described, a frame, a boom arm on said frame, means for raising and lowering the boom, guide means whereby the boom is swung in a predetermined arc, other guide means effective upon movement of the boom through said arc to move the boom longitudinally and thereby cause one end of the boom to travel on a straight line perpendicular to a horizontal plane, and manually actuated means on the frame for imparting longitudinal movement to the boom while the frame remains stationary.

2. In an apparatus of the character described, a frame, a boom arm mounted thereon, a carriage supporting the inner end of the boom, an arcuate guide track in which the carriage and the inner end of the boom is vertically movable, and means for bodily raising and lowering the entire boom together with the carriage.

3. In an apparatus of the character described, a frame, a boom arm mounted thereon, a carriage supporting the inner end of the boom, an arcuate guide track in which the carriage and the inner end of the boom are vertically movable, means for bodily raising and lowering the entire boom together with the carriage, and means for automatically imparting longitudinal movement to the boom during raising and lowering movement to cause the outer end of the boom to travel in a vertical line.

4. In an apparatus of the character described, a frame, a boom arm mounted thereon, a carriage supporting the inner end of the boom, an arcuate guide track in which the carriage and the inner end of the boom is vertically movable, means for bodily raising and lowering the entire boom together with the carriage, and manually actuated means for imparting longitudinal movement to the boom.

5. In an apparatus of the character described, a frame, a boom arm mounted thereon, a carriage supporting the inner end of the boom, an arcuate guide track in which the carriage and the inner end of the boom is vertically movable means for bodily raising and lowering the entire boom together with the carriage, means for automatically imparting longitudinal movement to the boom during raising and lowering movement to cause the outer end of the boom to travel in a vertical line, and manually actuated means for imparting longitudinal movement to the boom.

6. In an apparatus of the character described, a frame, a boom arm mounted thereon, a carriage supporting the inner end of the boom, an arcuate guide track in which the carriage and the inner end of the boom is vertically movable, means for raising and lowering the boom, a second carriage normally fixed with relation to the boom, and a second arcuate guide track for the last named carriage whereby longitudinal movement is automatically transmitted to the boom during raising and lowering movement to cause one end of the boom to travel in a predetermined path.

7. In an apparatus of the character described, a support, a carriage mounted to travel thereon, means for imparting longitudinal movement to the carriage a load handling member disposed in front of the carriage, a connection between the load handling member and the carriage, and means on the carriage engageable with said connection whereby longitudinal movement, tilting movement and elevating movement is transmitted to the load handling member during longitudinal movement of the carriage.

8. In an apparatus of the character described, a support, a carriage mounted to travel thereon, means for imparting longitudinal movement to the carriage, a load handling member disposed in front of the carriage, an arm forming a connection between the load handling member and the carriage, and cam members on the carriage engageable with the arm whereby longitudinal movement, tilting movement and elevating movement is transmitted to the load handling member during longitudinal movement of the carriage.

9. In an apparatus of the character described, a boom comprising a pair of parallel interspaced arms, a carriage supported by the arms, a load handling member actuated by the carriage, a pair of upright members on the load handling member, a shoe on each upright and slidable thereon, a shoe on each boom arm and slidable thereon, a pivotal connection between the first and last named shoes, means for raising and lowering the boom arms, means for imparting longitudinal movement to the carriage on the boom arms, a pair of arms forming a connection between the load handling member and the carriage, and cams on the carriage engageable with said arms whereby during longitudinal movement of the carriage, tilting movement, elevating movement and longitudinal movement is imparted to the load handling member with relation to the boom arms.

10. In an apparatus of the character described, a support, a carriage mounted on the support, a load handling member actuated by the carriage, a pair of upright members on the load handling member, a shoe on each upright and slidable thereon, a pair of shoes slidably mounted on the support, a pivotal connection between the first and last-named shoes, means for raising and lowering the support, means for imparting longitudinal movement to the carriage on the support, a pair of arms forming a connection between the load handling member and the carriage, and cams on the carriage engageable with said arms whereby during longitudinal movement of the carriage tilting movement, elevating movement and longitudinal movement is imparted to the load handling member with relation to the support.

11. In an apparatus of the character described a support, a carriage mounted to travel thereon, means for imparting longitudinal movement to the carriage, a load handling member disposed in front of the carriage, a sliding member on the load handling member, a sliding member on the support, a pivotal connection between said sliding members, an arm forming a connection between the load handling member and the carriage, and cam members on the carriage engageable with the arms whereby longitudinal movement, tilting movement and elevating movement is transmitted to the load handling member both with relation to the carriage and the support during longitudinal movement of the carriage.

12. In an apparatus of the character described, a support, a carriage mounted to travel thereon, means for imparting longitudinal movement to the carriage, a load handling member disposed in front of the carriage, a connection between the load handling member and the carriage, and means cooperating with the carriage and the load handling member whereby longitudinal movement, tilting movement and elevating movement are transmitted to the load handling member during longitudinal movement of the carriage.

AARON M. BACH.